Oct. 6, 1959 | P. D. HUME | 2,907,944

FREQUENCY MULTIPLIER

Filed May 11, 1956

2,907,944
Patented Oct. 6, 1959

2,907,944

FREQUENCY MULTIPLIER

Peter D. Hume, Baltimore, Md., assignor to Westinghouse Electric Corporation, East Pittsburgh, Pa., a corporation of Pennsylvania Application May 11, 1956, Serial No. 584,253

3 Claims. (Cl. 321—69)

This invention relates to devices for converting an alternating current signal of a given frequency into an alternating current signal of another frequency, and more particularly to a frequency multiplying circuit employing rectifying devices.

It is a primary object of this invention to provide a new and improved frequency multiplying circuit which is simple and economical in construction.

More specifically, an object of the invention lies in the provision of a frequency quadrupler in which input and output are single ended and in which only one center tapped transformer is employed. In contrast to the invention, previous known quadrupling circuits have used two push pull circuits in cascade which necessitated the use of two center tapped transformers rather than one.

A still further object of the invention is to provide a novel frequency doubling circuit which may be cascaded with a full-wave voltage doubler rectifier to produce a frequency quadrupler.

The above and other objects and features of the invention will become readily apparent from the following detailed description taken in connection with the accompanying drawings which form a part of this specification and in which.

Figure 1:
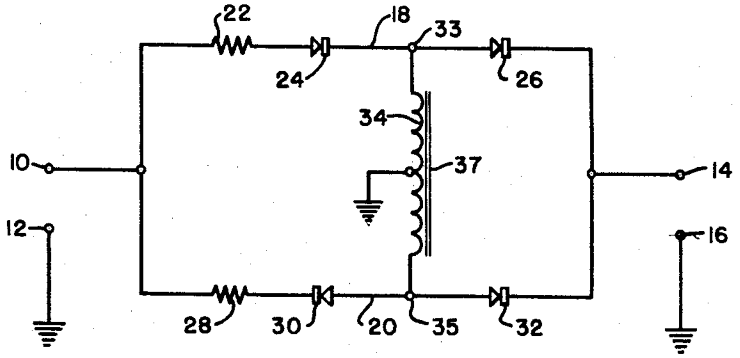
Figure 1 illustrates the invention in schematic circuit form.

Referring to Figure 1, the embodiment of the invention illustrated comprises a pair of input terminals 10 and 12 which are adapted for connection to a source of alternating current signals, not shown. Output signals from the circuit are taken from terminals 14 and 16. As shown, terminals 12 and 16 are connected to a source of reference potential or ground, while terminals 10 and 14 are interconnected by means of two parallel current paths 18 and 20. Path 18 includes a resistor 22 and two point contact silicon diodes 24 and 26, all connected in series. In a similar manner, path 20 includes resistor 28 and two point contact silicon diodes 30 and 32 connected in series. The point contact silicon diodes operate most effectively in the megacycle range. This, however, is not a requirement for efficient operation at power or audio frequencies where the circuit is also useful. Between the junction point 33 of diodes 24 and 26 and the junction point 35 of diodes 30 and 32 is connected an inductor 34 having its mid-point connected to ground. As shown, inductor 34 is inductively coupled to a magnetic core member 37. Diodes 24 and 30 are poled to conduct current in opposite directions between input terminal 10 and the grounded mid-point of inductor 34.

Figure 2:
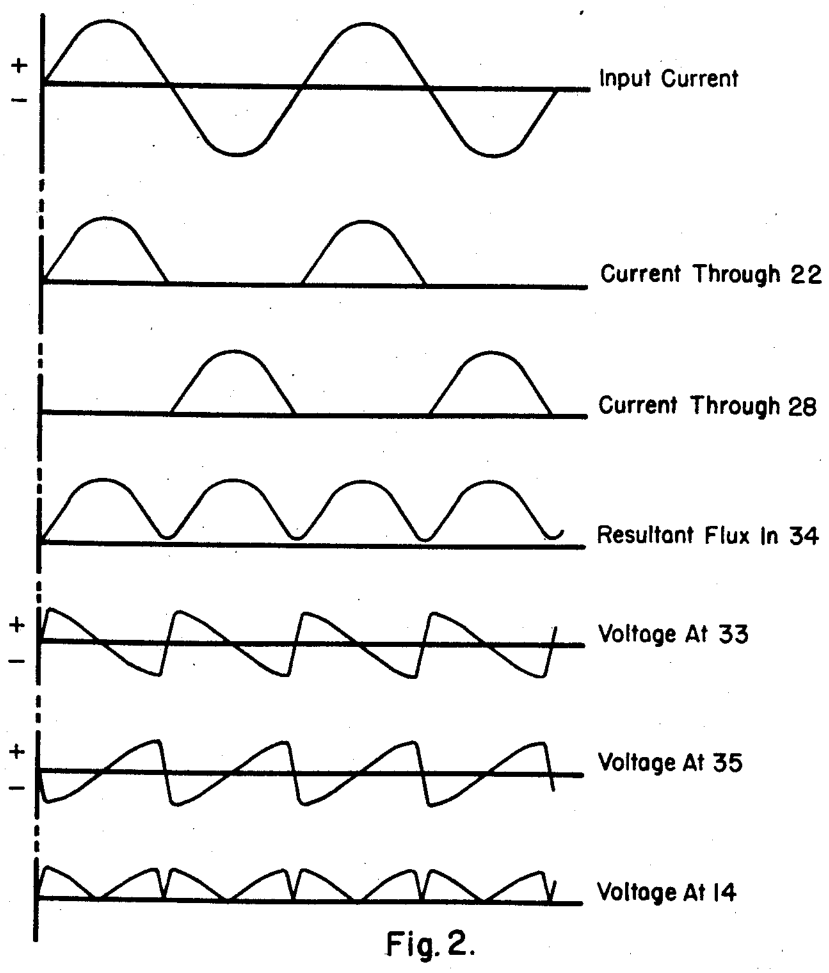
Fig. 2 is a series of waveforms illustrating current, flux and voltage conditions at various points in the circuit of Fig. 1.

Operation of the circuit may best be understood by reference to Fig. 2. When input terminal 10 is positive with respect to ground, diode 24 will conduct current between terminal 10 and the mid-point of inductor 34, thereby inducing a flux change in the inductor. When the input current waveform at terminal 10 falls to zero upon the completion of the positive half cycle of the input signal, the flux in inductor 34 will also fall to zero. This would not be the case if resistors 22 and 28 were not included in the circuit. Without them the inductor 34 would be partially shorted by the diodes 24 and 30, and the resulting low resistance short would lengthen the L/R time constant of the circuit and prevent rapid flux changes in the core of the inductor. The resultant rise and fall of the flux in inductor 34 causes point 33 to be first positive and then negative with respect to point 35 during the first half cycle of the input signal. On the second or negative half cycle, diode 30 will conduct while diode 24 blocks current flow. Again, the rise and fall of flux in inductor 34 causes point 33 to be first positive and then negative with respect to point 35 during the half cycle. In this manner the voltage at point 33 is reproduced in antiphase at point 35 so that inductor 34 becomes a center-grounded push-pull voltage source. It should be obvious, therefore, that a signal having double the frequency of the signal applied to terminals 10 and 12 will appear between points 33 and 35.

Diodes 26 and 32, in combination with the center-tapped inductor 34, comprise a conventional voltage doubler rectifier which will produce a signal across output terminals 14 and 16 having a frequency four times that applied to the input terminals 10 and 12. In operation, when the voltage at point 33 changes from positive to negative, the output voltage across terminals 14 and 16 will rise and fall twice. Consequently, the frequency at terminals 14 and 16 is twice that appearing across points 33 and 35 and four times that applied to terminals 10 and 12. The device operates in a balanced fashion and little of the input frequency appears at the output.

Although the invention has ben described in connection with a certain specific embodiment, it should be readily apparent to those skilled in the art that various changes in form and arrangement of parts can be made to suit requirements without deparing from the spirit and scope of the invention.

I claim as my invention:

1. A frequency multiplier comprising, first and second input terminals, first and second output terminals, means interconnecting said first input and output terminals, a first current channel connecting said second input and output terminals and including a first pair of unidirectional current devices connected in series to conduct current in the same direction, a second current channel connecting said second input and output terminals and including a second pair of unidirectional current devices connected in series to conduct current in opposite directions, an inductance element connecting said first channel at a point intermediate said first unidirectional current devices to said second channel at a point intermediate said second unidirectional current devices, and means connecting the mid-point of said inductance element to said first input and output terminals.

2. A frequency quadrupler comprising a pair of input terminals adapted for connection to an alternating current source, an inductance element, a connection between one of said input terminals and the mid-point of said inductance element, a first current path including a first unidirectional current device connecting one end of said inductance element to the other of said input terminals, a second current path including a second unidirectional current device connecting the other end of said inductance element to said other input terminal, said first and second unidirectional current devices being poled to conduct between said input terminals in opposite directions, a pair of output terminals one of which is connected to the mid-point of said inductance element, and a pair of unidirectional current devices connected between the opposite ends respectively of said inductance element and the other of said output terminals and poled to conduct current in the same direction between said output terminals.

3. A frequency multiplier comprising, a pair of input terminals adapted to be connected to a source of alternating current, a transformer having an intermediate tap, one of said pair of input terminals being connected to said intermediate tap, a first pair of unidirectional current devices connected between the other of said input terminals and opposite ends of said transformer respectively, said first pair of unidirectional current devices being poled to provide full wave rectification between said pair of input terminals and said transformer, a pair of output terminals, one of said pair of output terminals being connected to said intermediate tap, a second pair of unidirectional current devices being connected between opposite ends of said transformer and said other of said pair of output terminals, and said second pair of unidirectional current devices being poled to provide half wave rectification between said transformer and said pair of output terminals.

References Cited in the file of this patent

UNITED STATES PATENTS

| | | |
|---|---|---|
| 2,460,012 | Hurault | Jan. 25, 1949 |
| 2,567,383 | Krabbe et al. | Sept. 11, 1951 |

FOREIGN PATENTS

| | | |
|---|---|---|
| 440,954 | Italy | Oct. 22, 1948 |